United States Patent [19]

Yanidis

[11] Patent Number: 5,547,752
[45] Date of Patent: Aug. 20, 1996

[54] BLEND OF POLYBUTYLENE AND IONOMER FORMING EASY-OPEN HEATSEAL

[75] Inventor: Apostol Yanidis, Berkeley, Calif.

[73] Assignee: James River Paper Company, Inc., Milford, Ohio

[21] Appl. No.: 713,936

[22] Filed: Jun. 12, 1991

Related U.S. Application Data

[63] Continuation-in-part of Ser. No. 208,527, Jun. 20, 1988, abandoned.

[51] Int. Cl.$^6$ ........................................................ C09J 7/02
[52] U.S. Cl. ........................... 428/349; 428/355; 525/196; 525/221
[58] Field of Search ................................... 428/349, 355; 525/196, 221

[56] References Cited

U.S. PATENT DOCUMENTS

| | | | |
|---|---|---|---|
| 3,365,540 | 1/1968 | Foster | 525/201 |
| 4,082,877 | 4/1978 | Shandle | 428/35 |
| 4,189,519 | 2/1980 | Ticknor | 428/476 |
| 4,584,348 | 4/1986 | Nagano | 525/207 |
| 4,680,340 | 7/1987 | Oreglia | 525/72 |
| 4,766,174 | 8/1988 | Statz | 525/64 |
| 4,870,134 | 9/1989 | Hwo | 525/221 |

FOREIGN PATENT DOCUMENTS 6144937  3/1986  Japan .

*Primary Examiner*—Jenna Davis
*Attorney, Agent, or Firm*—Stanley M. Teigland

[57] ABSTRACT

When a flexible packaging material having a heatseal layer comprising a blend of about 15 to 50 percent polybutylene and about 50 to 85 percent of an ionomer is formed into a package by heatsealing the heatseal layer to itself, the strenth of the heatseal is between about 0.5 and 2.0 pounds per inch, with delamination occurring solely between the heatseal layers when the package is opened.

12 Claims, No Drawings

BLEND OF POLYBUTYLENE AND IONOMER FORMING EASY-OPEN HEATSEAL

This is a continuation-in-part of application Ser. No. 07/208,527 filed Jun. 20, 1988, now abandoned.

This invention relates to flexible packaging materials having a polymeric heatseal layer. The materials are formed into packages by heatsealing the heatseal layer to itself at margins of the package. The materials are used to package a variety of products, particularly food products, such as cereals, snack foods, etc.

The packages preferably have a heatseal that is strong enough to remain sealed before the package is deliberately opened but weak enough for the package to be easily opened. As taught in U.S. Pat. No. 3,496,061, opening of the package preferably occurs by delamination between the heatseal layers rather than by rupture of one of the heatseal layers. Rupture of the heatseal layer, such as shown in U.S. Pat. No. 3,655,503, results in undesirable formation of strands of material, which is referred to in the art as stringing.

The packaging material of this invention may be either a coextruded film or an extrusion-coated substrate. In either case, the heatseal layer is preferably coextruded with an immediately adjacent layer of a polymer that forms a stronger bond with the heatseal layer than the heatseal layer forms with itself. An example of such a polymer is ethylene-vinyl acetate copolymer (EVA), with the vinyl acetate content of the copolymer being preferably between about 18 and 28 percent by weight.

In the case of an extrusion coated substrate, the substrate may be paper, and preferably is paper coated with a layer which is a barrier to moisture and oxygen, such as a layer of polyvinylidene chloride (saran). The heatseal layer and the EVA layer are coextruded onto the substrate.

When the packaging material is a coextruded film, the film preferably includes at least one other polymer layer, such as a polyolefin, which provides desired properties, such as strength, stiffness, barrier properties, etc.

The packaging material has a heatseal layer which forms, when heatsealed to itself, an easy-open heatseal. The strength of the heatseal is preferably between about 0.5 and 2.0 pounds per inch. When the heatseal is opened by pulling opposing sides of the material apart, delamination occurs solely between the heatseal layers (cohesive heatseal failure), so stringing does not occur.

The heatseal layer comprises a blend of about 15 to 50 percent by weight, preferably 20 to 40 percent, polybutylene and about 50 to 85 percent by weight, preferably 60 to 80 percent, ionomer. Minor amounts of other components, such as slip additive, may be added. In preferrred embodiments, the heatseal layer consists of at least about 90 percent by weight of the blend of polybutylene and ionomer.

The term ionomer refers to a film-forming copolymer of an olefin and an ethylenically unsaturated monocarboxylic acid wherein at least 10% of the carboxylic acid groups are neutralized by a metal ion, preferably zinc. The olefin has the formula $RCH=CH_2$ where R is hydrogen or an alkyl group having up to 8 carbon atoms. The olefin is preferably ethylene. The carboxylic acid is preferably acrylic acid, methacrylic acid, or methylmethacrylic acid. The proportion of olefin units in the ionomer is at least 50, preferably at least 80, mole percent. The proportion of acid units is preferably from 1 to 20 mole percent. Suitable ionomers are described in U.S. Pat. No. 3,355,319 and are available commercially under the trademark SURLYN.

The term polybutylene refers to film-forming polymers of isotactic butene-1 containing from zero to six percent by weight of ethylene comonomer. They are made by stereospecific Ziegler-Natta polymerization. The homopolymers have a crystallinity of 48 to 55% and the copolymers have a crystallinity of 35 to 45% depending on the ethylene content. Being isotactic and crystalline, they are not elastomeric. Polymers of butene-1 or isobutylene that are elastomeric would not be suitable for use in this invention because they tend to form bonds that are strong rather than easy to open, as described in U.S. Pat. No. 4,584,348 to Nagano.

In forming packages from the flexible packaging material of this invention, opposing sections of the heatseal layers are fused together under conventional heatsealing conditions, such as by the application of a presure of 30 psi for one-half second at a temperature between about 230° and 250° F. The heatseal layer has sufficient tack strength at the temperature of fusion that the seal remains closed as it cools even though the package formed from the material is filled with product. The tack strength of the heatseal layer is at least 75 grams per square inch and in preferred embodiments is at least 125 grams per square inch.

The thickness of the heatseal layer is preferably between about 0.25 and 0.75 mil.

EXAMPLE

A flexible packaging material was prepared by coextruding a polymer composition onto a substrate consisting of paper coated with a layer of polyvinylidene chloride (PVDC). The coextruded polymer composition consisted of a layer of EVA and a heatseal layer consisting of a blend of 70 percent of an ionomer (SURLYN 1652 SB resin), 28 percent of polybutylene (SHELL 1710 SA resin), and 2 percent of a slip additive. The EVA layer was next to the PVDC layer. The composition was extruded at a temperature of 450 F.

Packages suitable for packaging cereal were formed from the material by heatsealing the heatseal layer to itself by applying a presure of 30 psi for 0.5 second at a temperature of 250 F. The heatseal had a hot tack strenth of 150 grams per square inch. The strength of the heatseal was 1.3 pounds per inch, with the seal delaminating solely between the heatseal layers.

I claim:

1. In a flexible packaging material having a polymeric heatseal layer, the improvement wherein a) the heatseal layer is a blend comprising about 15 to 50 percent by weight isotactic nonelastomeric polybutylene and about 50 to 85 percent by weight of a copolymer of an olefin and an ethylenically unsaturated monocarboxylic acid wherein at least 10 percent of the carboxylic acid groups are neutralized by a metal ion, b) the strength of a heatseal formed by heatsealing the heatseal layer to itself is such that the heatseal is easy to open, with delamination occurring solely between the heatseal layers when the heatseal is opened, and c) the heatseal layer is bonded directly to a coextruded layer of a polymer that forms a stronger bond with the heatseal layer than the heatseal layer forms with itself.

2. The improvement of claim 1 wherein the heatseal layer has a tack strength at the temperature at which the heatseal is formed of at least 125 grams per square inch.

3. The improvement of claim 1 wherein the heatseal layer is bonded directly to a coextruded layer of an ethylene-vinyl acetate copolymer.

4. The improvement of claim 3 wherein the vinyl acetate content of the ethylene-vinyl acetate copolymer is between about 18 and 28 percent by weight.

5. The improvement of claim 4 wherein the blend comprises about 20 to 40 percent by weight of the polybutylene and about 60 to 80 percent by weight of the copolymer.

6. In a package formed from a flexible packaging material having a polymeric heatseal layer formed by heatsealing the heatseal layer to itself, the improvement wherein
   a) the heatseal layer is a blend comprising about 15 to 50 percent by weight isotactic, nonelastomeric polybutylene and about 50 to 85 percent by weight of a copolymer of an olefin and an ethylenically unsaturated monocarboxylic acid wherein at least 10 percent of the carboxylic acid groups are neutralized by a metal ion,
   b) the strength of a heatseal formed by heatsealing the heatseal layer to itself is such that the heatseal is easy to open, with delamination occurring solely between the heatseal layers when the heatseal is opened, and
   c) the heatseal layer is bonded directly to a coextruded layer of a polymer that forms a stronger bond with the heatseal layer than the heatseal layer forms with itself.

7. The package of claim 6 wherein the heatseal layer has a tack strength at the temperature at which the heatseal is formed of at least 125 grams per square inch.

8. The package of claim 6 wherein the heatseal layer is bonded directly to a coextruded layer of an ethylene-vinyl acetate copolymer.

9. The package of claim 8 wherein the vinyl acetate content of the ethylene-vinyl acetate copolymer is between about 18 and 28 percent by weight.

10. The package of claim 9 wherein the blend comprises about 20 to 40 percent by weight of the polybutylene and about 60 to 80 percent by weight of the copolymer.

11. The improvement of claim 1 wherein the strength of the heatseal is between about 0.5 and 2.0 pounds per inch.

12. The package of claim 6 wherein the strength of the heatseal is between about 0.5 and 2.0 pounds per inch.

* * * * *